United States Patent
Huber

(10) Patent No.: US 7,061,680 B2
(45) Date of Patent: Jun. 13, 2006

(54) ADJUSTING CONTRAST IN AN OPTICAL SYSTEM

(75) Inventor: Mark Huber, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 10/873,988

(22) Filed: Jun. 21, 2004

(65) Prior Publication Data

US 2004/0257788 A1 Dec. 23, 2004

Related U.S. Application Data

(60) Provisional application No. 60/481,002, filed on Jun. 20, 2003, provisional application No. 60/481,001, filed on Jun. 20, 2003.

(51) Int. Cl.
*G02B 27/28* (2006.01)

(52) U.S. Cl. .......................... 359/501; 353/10; 353/20; 40/434

(58) Field of Classification Search ................. 359/485, 359/501, 629–631, 487, 495, 497; 362/19; 353/20, 10; 40/434
See application file for complete search history.

(56) References Cited

U.S. PATENT DOCUMENTS

| | | | |
|---|---|---|---|
| 2,152,513 A | 3/1939 | West | |
| 2,301,126 A | 11/1942 | Kriebel | |
| 2,313,831 A | 3/1943 | Martin | |
| 2,409,407 A | 10/1946 | Turner | |
| 2,470,156 A | 5/1949 | Fry | |
| 3,252,375 A | 5/1966 | Bunting | |
| 3,711,128 A | 1/1973 | Jasgur | |
| 4,007,979 A | 2/1977 | Coblitz | |
| 4,501,473 A * | 2/1985 | Stone | 359/501 |
| 4,657,512 A | 4/1987 | Mecklenborg | |
| 4,879,603 A | 11/1989 | Berman | |
| 5,469,295 A | 11/1995 | Burke | |
| 5,629,492 A | 5/1997 | Gleason | |
| 5,629,806 A * | 5/1997 | Fergason | 359/630 |
| 5,782,547 A * | 7/1998 | Machtig et al. | 353/28 |
| 5,793,470 A | 8/1998 | Haseltine et al. | |
| 5,999,317 A * | 12/1999 | Whitney | 359/501 |
| 6,262,841 B1 * | 7/2001 | Dike | 359/483 |
| 6,375,326 B1 * | 4/2002 | Myers | 353/10 |
| 6,398,364 B1 | 6/2002 | Bryars | |
| 6,808,268 B1 * | 10/2004 | Vrachan et al. | 353/10 |
| 6,817,716 B1 * | 11/2004 | Hines | 353/10 |
| 2003/0020879 A1 * | 1/2003 | Sonehara | 353/7 |

\* cited by examiner

*Primary Examiner*—Mark A. Robinson
*Assistant Examiner*—Lee Fineman
(74) *Attorney, Agent, or Firm*—Greenberg Traurig, LLP; Margo Maddux; Neer Gupta, Esq.

(57) ABSTRACT

An improved object projection system provides an observer with a surrounding background that has adjustable contrast levels relative to an object. A transmissive polarizer and a reflective polarizer change relative orientations. The change in orientation causes the level of light passing through the transmissive polarizer to change. In one system, the transmissive polarizer is placed in front of an object. A light source is placed in front of the object and behind the transmissive polarizer. A reflective polarizer is placed behind the object. The reflective polarizer provides the surrounding background for the object. A light source illuminates the object and the reflective polarizer. The object emits reflected light, which travels through the transmissive polarizer. Light from the reflective polarizer is transmitted to the transmissive polarizer. The level of light transmitted depends on the orientation of a transmissive axis of the transmissive polarizer to a reflective axis of the reflective polarizer.

36 Claims, 19 Drawing Sheets

ADJUSTING CONTRAST IN AN OPTICAL SYSTEM

RELATED APPLICATIONS

This application claims the priority date of U.S. Provisional Applications No. 60/481,002 entitled "MAXIMIZING THE SWEET SPOT IN A REAL IMAGE PROJECTION SYSTEM" and No. 60/481,001 entitled "INCREASING CONTRAST IN OPTICAL SYSTEMS" filed on Jun. 20, 2003, the contents of which are incorporated by reference in its entirety.

SURROUNDING BACKGROUND

1. Field

This disclosure relates to adjusting the contrast in optical systems. In particular, this disclosure relates to adjusting the contrast between an image and the surrounding background.

2. Surrounding Background

Special effects designers use a real image projection system to generate an image of an object. For example, a real image projection system may be used to create a floating real image of an object that appears to an observer from nowhere. Generally, the floating real image is surrounded by a surrounding background. The surrounding background may be intrusive and interfere with observing the floating real image of an object. In this case, it is desirable to remove the surrounding background from the floating real image of an object. Further, present real image projection systems suffer from stray light rays bouncing off the hardware such as the optical elements associated with the real image projection system or the surrounding background such as a ceiling or a floor. The stray light rays are problematic because these rays make the hardware visible to an observer. The viewing of the hardware may ruin the perception of an observer of the floating real image of the object.

A common way of addressing these above problems is to make the enclosure black, such as using black velvet, so that reflected light and stray light rays are absorbed and appear invisible to an observer. However, there is a need for an improved process for producing images that highly contrast to the surrounding background and provide other improvements over present systems.

SUMMARY

An improved optical system, as disclosed herein, uses optical polarizers where changing the relative orientation of the optical polarizers adjust the contrast level between an object and its surrounding background. For instance, special effects design engineers for studios or movie houses may utilize this improved optical system for creating a floating image of an object, such as a ghost, while being able to actively control the intensity level of the surrounding background. Other applications include convenience stores, train stations, or other locations where an image of an object needs to be displayed on a remotely located wall or other surface.

In one aspect, an improved optical system includes a reflective polarizer, a transmissive polarizer and a light source. The reflective polarizer is a material having a reflective axis that reflects light that vibrates in the same plane as the reflective axis. Light aligned along the reflective axis is reflected from the reflective polarizer and appears as the surrounding background for the object. The transmissive polarizer is a material having a transmissive axis that transmits light vibrating in the same plane as the transmissive axis. Light aligned along the transmissive axis is transmitted from the transmissive polarizer. In this system, an object is placed in front of the reflective polarizer. The transmissive polarizer is placed in front of the object. A light source illuminates the object and the reflective polarizer. Light received at the object reflects toward the reflective polarizer and the transmissive polarizer. Light received at the reflective polarizer aligned with the reflective axis is reflected from the reflective polarizer back toward the transmissive polarizer. Light received at the transmissive polarizer aligned with the transmissive axis passes through the transmissive polarizer to an observer. Light received from the reflective polarizer passes through the transmissive polarizer to an observer depending on the orientation of the transmissive axis to the reflective axis.

If the transmissive axis and the reflective axis are oriented substantially orthogonal to each other, the effect created is a dark surrounding background. In this orientation, if the object is lightly colored, the object has maximum optical contrast to the surrounding background. In this same orientation, if the object is dark-colored, the object has minimum optical contrast to the surrounding background.

If the transmissive axis and the reflective axis are oriented substantially parallel, the effect created is a light surrounding background. In this orientation, if the object is lightly-colored, the object has minimum optical contrast to the surrounding background. In this same orientation, if the object is dark-colored, the object has maximum optical contrast to the surrounding background.

In yet another aspect, rotation of the transmissive axis with respect to the reflective axis controls the intensity of the surrounding background. The effect is that a user can gradually transition from a dark to a light surrounding background by rotating the transmissive axis relative to the reflective axis.

In another aspect, an optical lens, a polarization maintaining reflective surface, and a beam splitter are added to the above optical system. The additional optical elements provide for a real image of the object to be distally located from the object. An optical lens is, for example, a polarization maintaining lens such as a Fresnel lens. The polarization maintaining surface is a first surface mirror. The beam splitter is, for example, a 50% transmissive, 50% reflective light surface. In this system, a reflective polarizer is placed in front of an object. A light source illuminates the object and the reflective polarizer. An optical lens is placed behind an object but in front of a mirror. A transmissive polarizer is placed in front of the mirror. A light source illuminates the object and the reflective polarizer. Light reflected from the object travels to a beam splitter. Light arriving at the reflective polarizer along the reflective axis is reflected toward the beam splitter.

Light passes through the beam splitter to the optical lens. The optical lens transmits light toward the polarization maintaining surface. Light reflected from the polarization maintaining surface is reflected back to the beam splitter. Light reflected from the beam splitter travels to the transmissive polarizer distally located from the object. At the transmissive polarizer, a real image of the object passes through the transmissive polarizer. The intensity of the real image of the object is a substantially fixed intensity level substantially independent of transmissive axis to reflective axis orientation. Similar to the embodiment described above, rotating the transmissive to the reflective axis causes the surrounding background of the object to change from dark to light.

In yet another embodiment, an improved projection system produces a larger effective display area for the real image of the object. The larger effective display area is the result of creating two geographically separate locations, i.e., one for the object and the other for the real image of the object. The geographic separation of the object and real image of the object creates a 2-fold increase in area for the real image of the projection system. In this system, there are sweet spots, one for the object and the other for the real image of the object that are distally located from each other. Light illuminates the object. Light reflected from the object passes through a beam splitter. A mirror reflects light arriving from the beam splitter back toward the beam splitter. Light arriving at the beam splitter travels away from the object to another geometric location. Thereby, the beam splitter and the mirror working in cooperation create a real image of the object at a location geographically separate from the object.

The foregoing and other objects, features, and advantages of the present disclosure will be become apparent from a reading of the following detailed description of exemplary embodiments thereof, which illustrate the features and advantages of the disclosure in conjunction with references to the accompanying drawing Figures.

DETAILED DESCRIPTION

Figure 1:
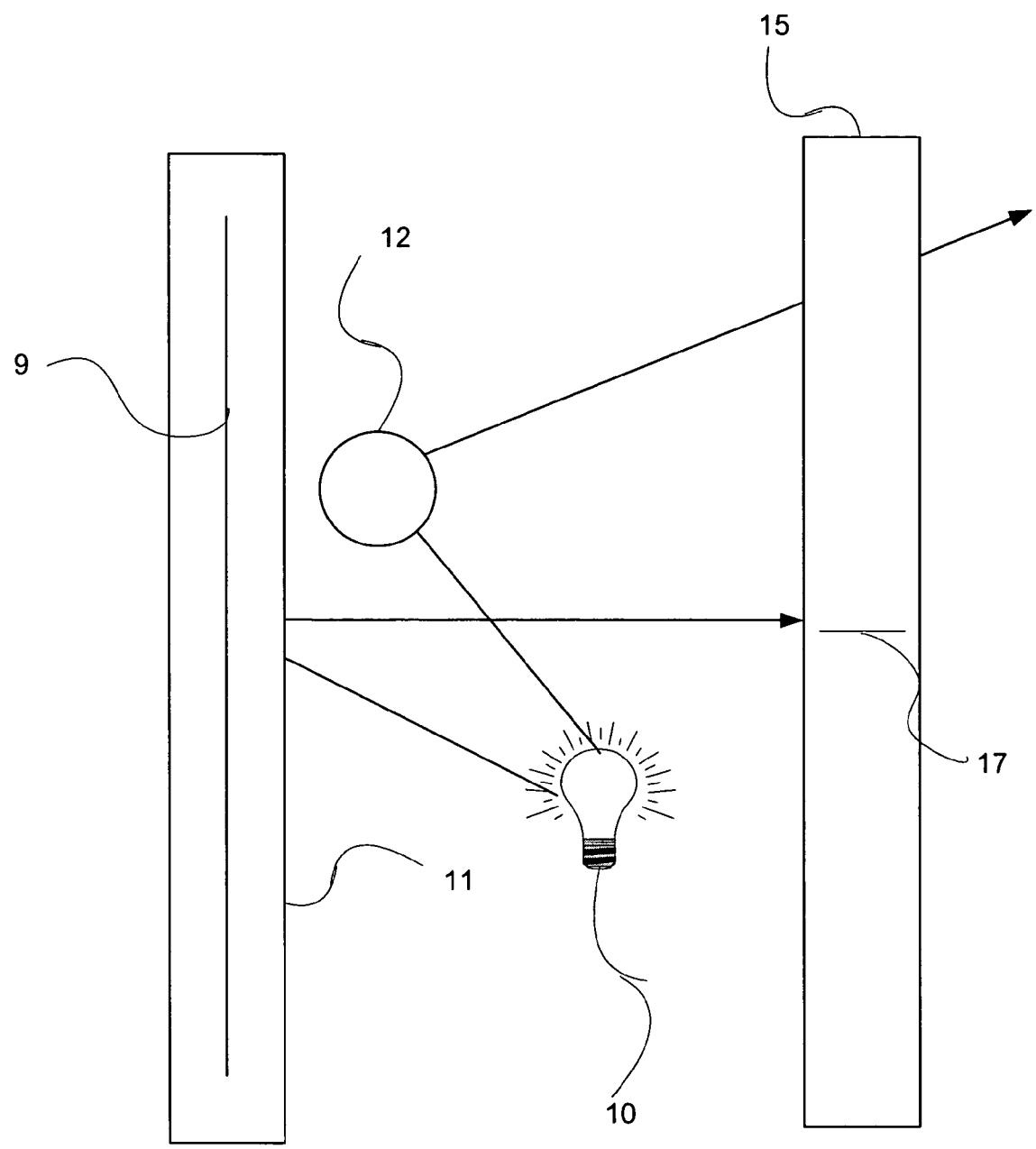
FIG. 1 is a schematic diagram of one embodiment using a reflective polarizer and a transmissive polarizer for producing an object with a high contrast level relative to the surrounding background.

FIG. 1 is a schematic diagram of one embodiment wherein a reflective polarizer and a transmissive polarizer are utilized to adjust the contrast level between an object and a surrounding background. An improved optical system includes reflective polarizer 11, transmissive polarizer 15 and light source 10.

Reflective polarizer 11 is a material having a reflective axis 9 that reflects light that vibrates in the same plane as the reflective axis 9. Light aligned along reflective axis 9 is reflected from reflective polarizer and appears as the surrounding background for object 12. For example, reflective polarizer 11 is manufactured by International Polarizer having a polarization maintaining surface, a pressure sensitive adhesive, and a polarizing film.

In another example, reflective polarizer 11 is a glass plate having one surface deposited with silver for reflecting light and for maintaining incident light polarity. The opposite surface of the glass plate deposited with a pressure sensitive adhesive, and laminated with polarizing element. Polarizing element creates a reflective axis 9. Polarizing element may be a thin-film material of type Hn-32 manufactured by 3M. In yet another example, polarizing element may have a first surface coated with a polarization maintaining reflective material. In the alternative, reflective polarizer 11 may be an aluminum on glass polarizer manufactured by Moxtek, Inc. In this alternative, one surface of this glass polarizer is coated with a polarization maintaining reflective material such as silver paint like Krylon 1401 silver.

Transmissive polarizer 15 is a material having transmissive axis 17 that transmits light vibrating in the same plane as transmissive axis 17. Light aligned along transmissive axis 17 passes through transmissive polarizer 15. In one aspect, transmissive polarizer 15 is a glass plate deposited on one side with a polarizing material such as Moxtek to create transmissive axis 17. In another aspect, polarizing material may be an organic film such as Hn-32 from manufacturer 3M.

Light source 10 is a light providing illumination for object 12. Light source 10 may be a movie house production light such as ETC source four providing 750 watts of illumination.

In this system, light source 10 illuminates object 12 and reflective polarizer 11. Light arriving at object 12 is reflected toward reflective polarizer 11 and transmissive polarizer 15. Light from object 12 that aligns with the transmissive axis 17 of transmissive polarizer 15 passes through transmissive polarizer 15. Light arriving at reflective polarizer 11 aligned along reflective axis 9 is reflected to transmissive polarizer 15. Reflective polarizer 11 reflects light along reflective axis 9. Transmissive polarizer 15 receives light from reflective polarizer 11.

If reflective axis 9 and transmissive axis 17 are substantially orthogonal, light from reflective polarizer 11 is reflected, blocked, or absorbed by transmissive polarizer 15. The effect is that object 12 appears against a dark surrounding background. Thus, this orientation provides a maximum contrast level between the object and the surrounding background. The brightness of object 12 is a substantially fixed intensity, and independent of a relative transmissive axis 17 orientation because the reflected light from the object is not polarized. The brightness of object 12 substantially depends on the intensity of light source 10.

Figure 2:
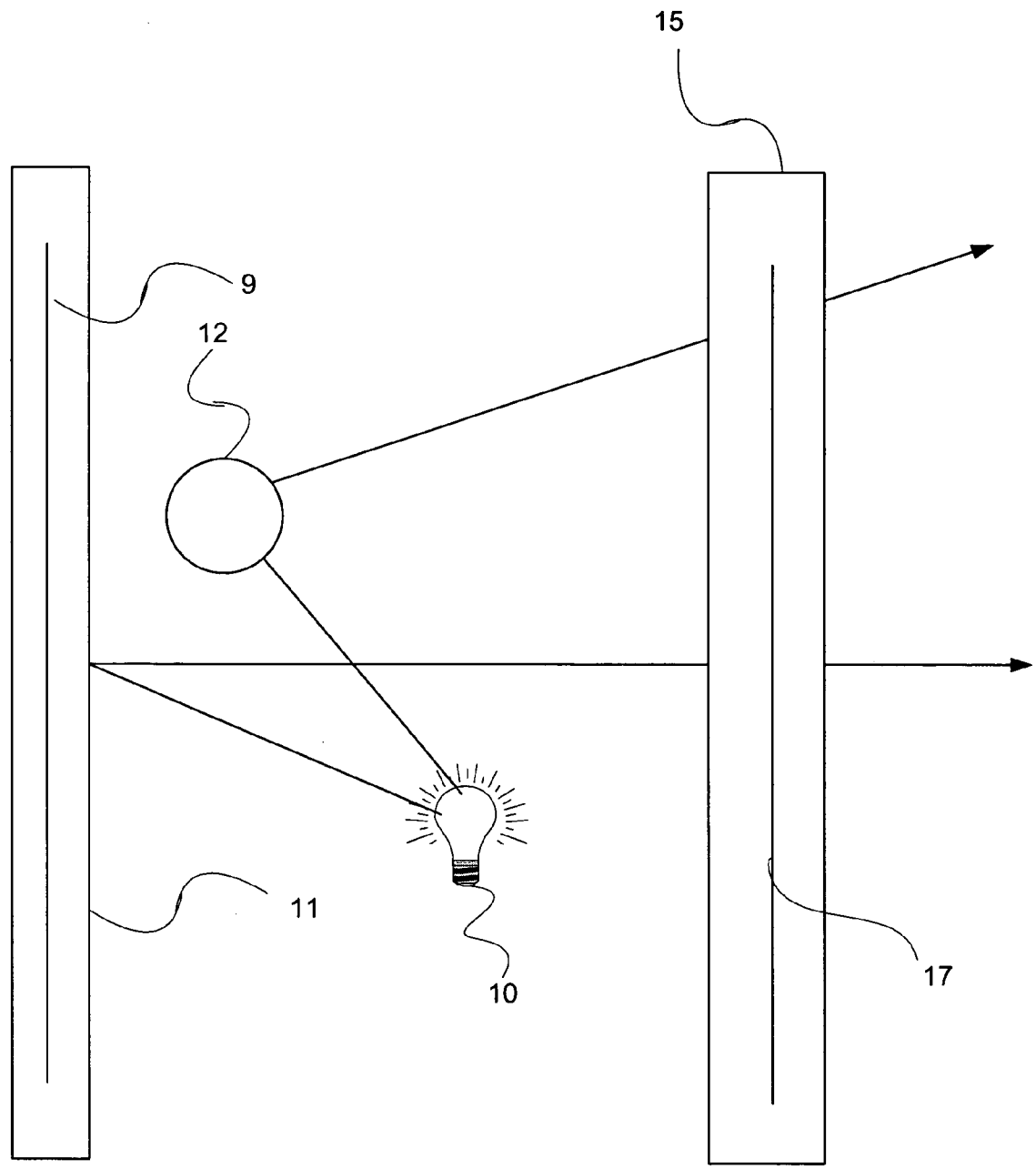
FIG. 2 is a schematic diagram of one embodiment using a reflective polarizer and a transmissive polarizer for producing an object with a low contrast level relative to the surrounding background.

FIG. 2 is a schematic diagram of one embodiment using a reflective polarizer and a transmissive polarizer for producing an object with a low contrast level relative to the surrounding background.

This embodiment describes using reflective polarizer 11 and transmissive polarizer 15 of FIG. 1 where transmissive polarizer 15 is rotated 90 degrees. Reflective polarizer 11 has a reflective axis 9. Transmissive polarizer 15 has transmissive axis 17. In this aspect, reflective axis 9 and transmissive axis 17 are substantially parallel. The effect is that object 12 appears against a light surrounding background. If the object is lightly-colored, this relative orientation provides a low contrast level between the object and the surrounding background.

In another aspect, the rotation of the relative orientation of transmissive axis 17 to reflective axis 9 controls the contrast level between the object and its surrounding background. The effect is that a user can gradually transition from a dark to a light surround background by rotating transmissive axis 17 relative to reflective axis 9. For example, rotating transmissive axis 17 to reflective axis 9 from substantially orthogonal to substantially parallel transitions from a dark surrounding background to a minimum contrast level (light surrounding background) between the object and the surrounding background). In this aspect, the object is lightly-colored.

Figure 3:
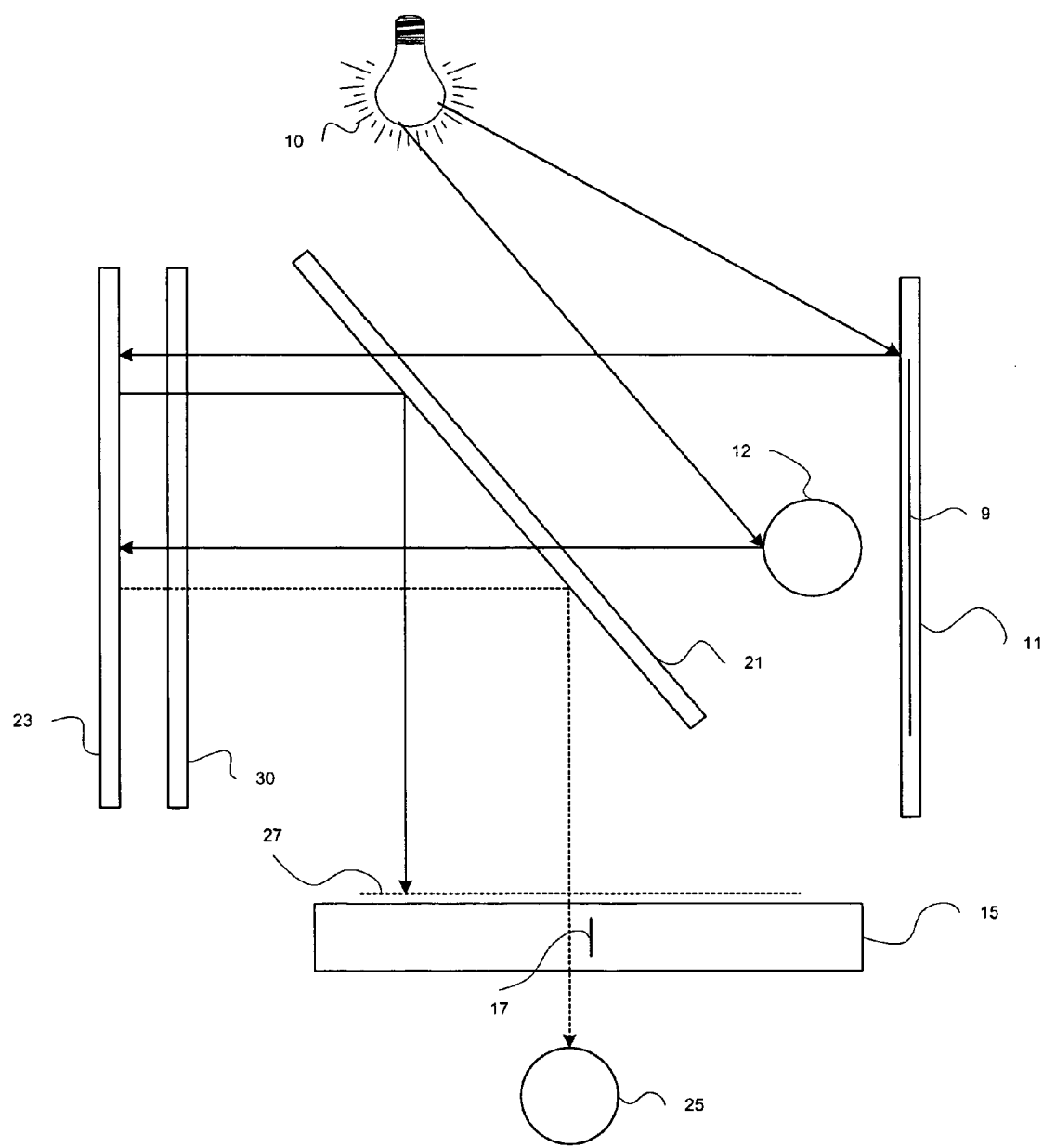
FIG. 3 is a schematic diagram of one embodiment using a reflective polarizer, a polarization maintaining lens, a beam splitter, a mirror and a transmissive polarizer for producing a real image of an object with a high contrast level relative to the surrounding background.

FIG. 3 is a schematic diagram of one embodiment using a reflective polarizer, a polarization maintaining lens, a beam splitter, a mirror and a transmissive polarizer for producing a real image of an object with a high contrast level relative to the surrounding background.

For example, beam splitter 21 is a 50% transmissive, 50% reflective mirror. In another example, beam splitter may have any ratio of transmissive to reflective properties. Further, in this example, optical lens 30 is a polarization maintaining lens such as a Fresnel lens. Reflective surface 23, for example, is a mirror or like device.

In this system, light source 10 illuminates reflective polarizer 11 and object 12. The light reflected from object 12 travels to beam splitter 21. Light incident on reflective polarizer 11 along reflective axis 9 is reflected to beam splitter 21. Light traveling through beam splitter 21 passes through optical lens 30. Optical lens 30 focuses light traveling to reflective surface 23. Optical lens 30 may be a Fresnel lens. Reflective surface 23 may be a mirror or like device. In another aspect, optical lens 30 and reflective surface 23 may be combined into one optical element such a reflective Fresnel lens.

Light bounces off reflective surface 23 and passes back through optical lens 30 to beam splitter 21. Beam splitter 21 transmits light to transmissive polarizer 15. Light arriving along transmissive axis 17 is transmitted. In this aspect, light from reflective axis 9 is blocked. Real image of the object 25 appears against a dark surrounding background 27. For a lightly-colored real image of the object, this aspect provides the effect of a high contrast level between the real image of the object 25 and surrounding background 27.

Figure 4:
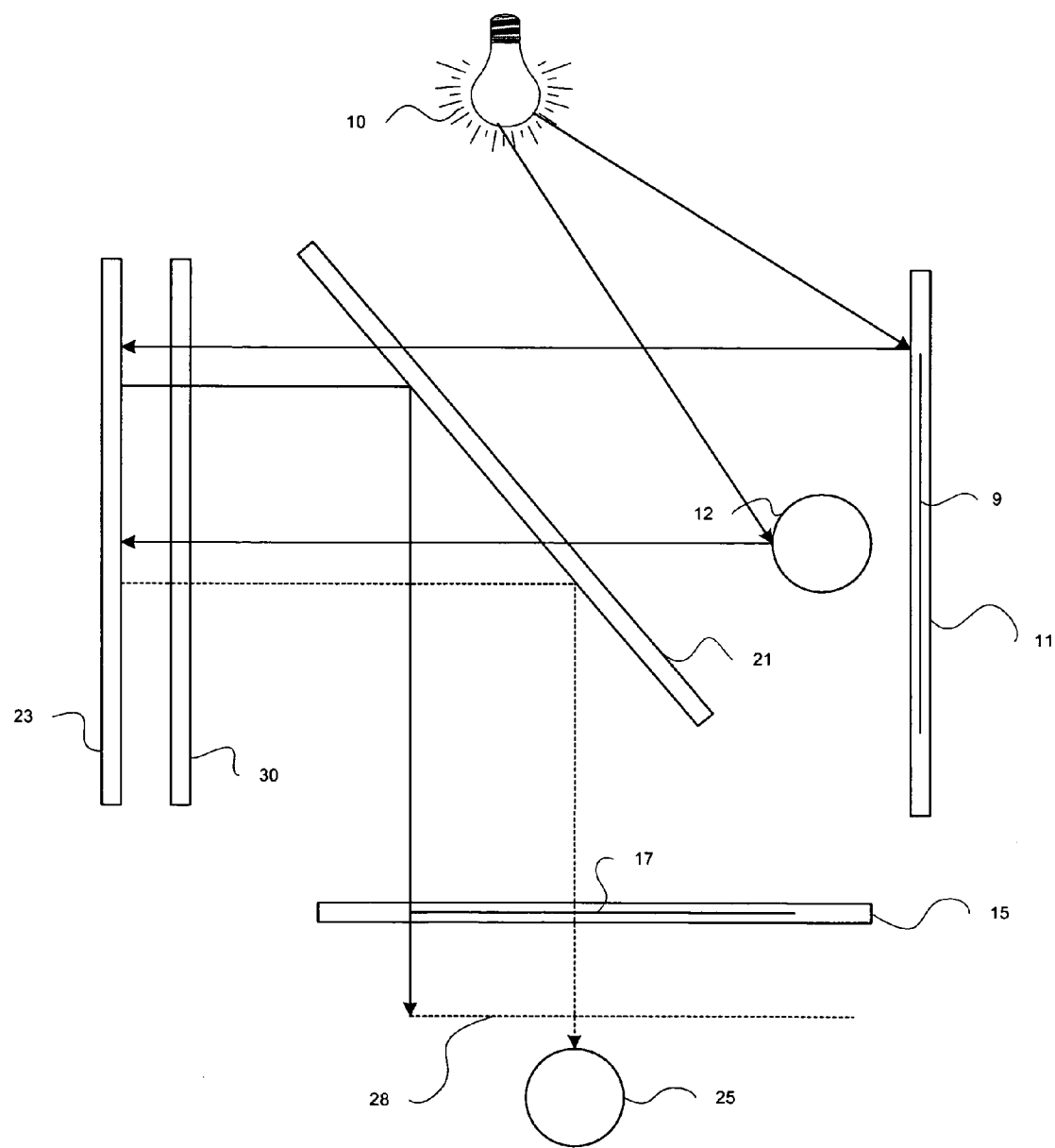
FIG. 4 is a schematic diagram of one embodiment using a reflective polarizer, a polarization maintaining lens, a beam splitter, a mirror and a transmissive polarizer for producing a real-image of an object with a low contrast level relative to the surrounding background.

FIG. 4 is a schematic diagram of one embodiment using a reflective polarizer, a polarization maintaining lens, a beam splitter, a mirror and a transmissive polarizer for producing a real-image of an object with a low contrast level relative to the surrounding background.

Reflective axis 9 and transmissive axis 17 are substantially parallel (approximately zero degrees) relative to each other. This embodiment functions similar to the one described above in FIG. 3 except for the above-mentioned relative orientation of reflective axis 9 and transmissive axis 17. Light reflected from reflective polarizer 11 is transmitted through transmissive axis 17. Object 12 appears against light surrounding background 29. This relative orientation of transmissive axis 17 to reflective axis 9 provides a low contrast level between real image of the object 25 that is lightly-colored and light surrounding background 29.

In another aspect, as transmissive axis 17 to reflective axis 9 rotates from substantially orthogonal (substantially 90 degrees) to substantially zero degrees, the effect is that the surrounding background gradually transitions from dark to light. In addition, reflective axis 9 and transmissive axis 17 capture and nullify stray light rays in an optical system for hiding the optical elements or hardware of a real image projection system.

Figure 5:
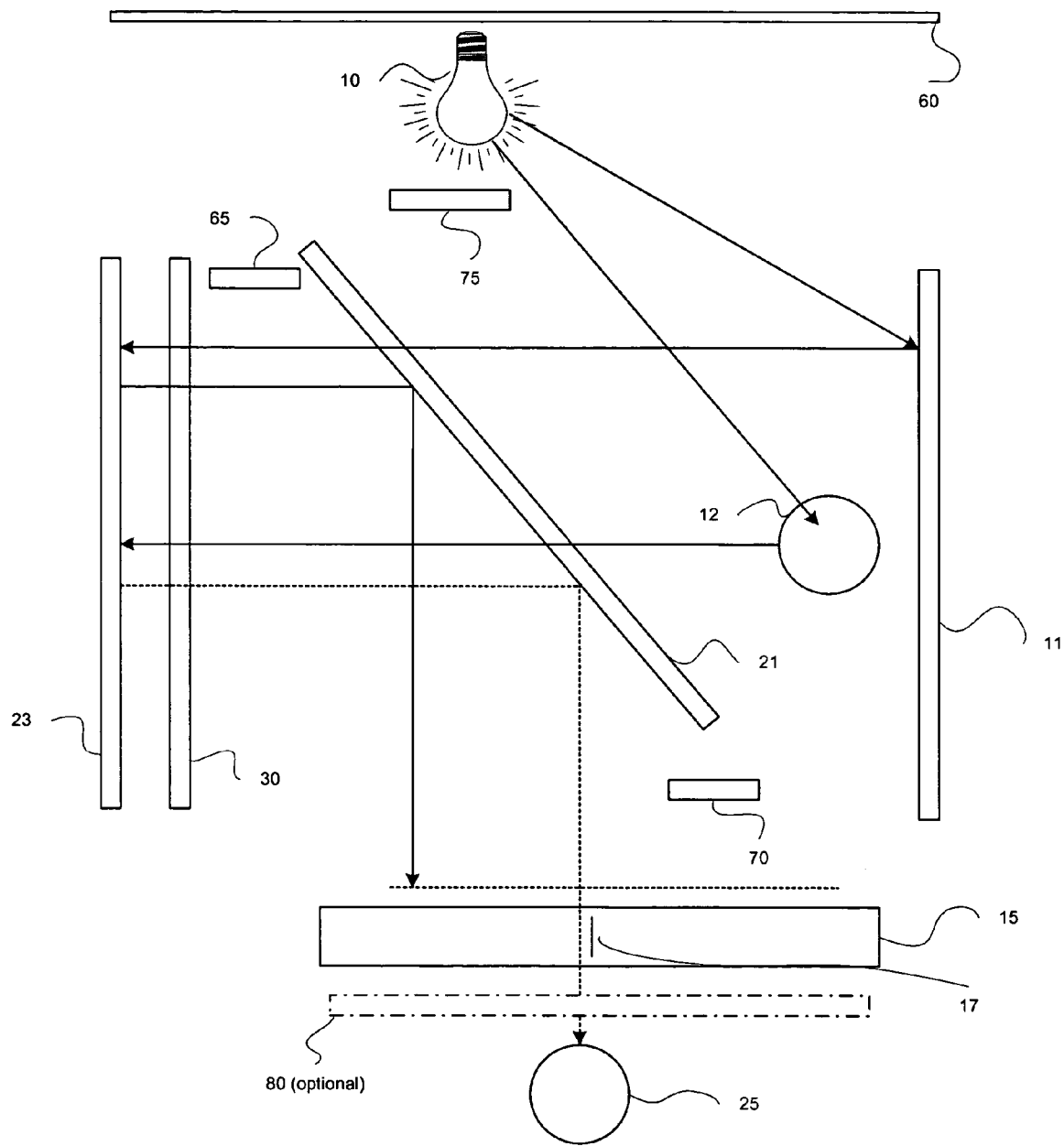
FIG. 5 is a schematic diagram of FIGS. 3 and 4 embodiments using polarized baffles for decreasing stray reflected light.

FIG. 5 is a schematic diagram for FIGS. 3 and 4 real image projection systems using polarized baffles. A polarized baffle is a reflective polarizer such as previously discussed in above embodiments. To further nullify stray light rays, one or more polarized baffles are strategically deployed within the real image projection system. Polarized baffles 60, 65, 75, 70 are placed in strategic locations to absorb stray light or reflections from optical elements or hardware. Optical elements and hardware may include beam splitters, reflective polarizers, mirrors, and the like.

Polarized baffles prevent stray light rays appearing in the surrounding background. Polarized baffles are placed such that the polarizing baffle appears black when the polarized baffle is viewed through the transmissive polarizer 15. It should be noted that these are exemplary locations for the polarized baffles. The polarized baffles may be repositioned to remove stray light rays.

For example, polarized baffle 60 located behind source 10 absorbs stray light from optical elements such as source 10. In another example, polarized baffle 75 located between source 10 and beam splitter 20 absorbs stray light rays, for example, from source 10 before striking beam splitter 21. In yet another example, polarized baffle 65 located between optical lens 30 and beam splitter 21 absorbs stray light from optical elements, for example, optical lens 30 and reflective surface 23. In another example, polarized baffle 70 located between transmissive polarizer 15 and beam splitter 21 absorbs stray light from optical elements, for example, object 12 and source 20.

Polarized baffles prevent stray light rays making their way to transmissive polarizer 15 which can prevent an observer from seeing a real image of the object 25 mysteriously disappear and reappear. Post optical elements 80 are strategically deployed to further differentiate the real image of the object and the surrounding background.

In one aspect, post optical element 80 is a scrim or a mirror. In one example, post optical element 80 passes real image of object 25 but not stray light rays and/or optical artifacts. The effect is to create for an observer an illusion of a real object.

In another example, post optical element 80 may be a 50% transparent and 50% reflective mirror. The effect of using a reflective mirror is to block stray light and assist in separating the surrounding background from object. In this aspect, real image of the object 25 appears to an observer as an illusion.

In another example, if post optical element 80 is a mirror, an observer will view real image of the object 25 without casting any reflection in the mirror. Thus, real image of the object 25 not casting a reflection in the mirror strengthens the illusion to an observer that real image of the object 25 is actually a ghost or an apparition.

Figure 6:
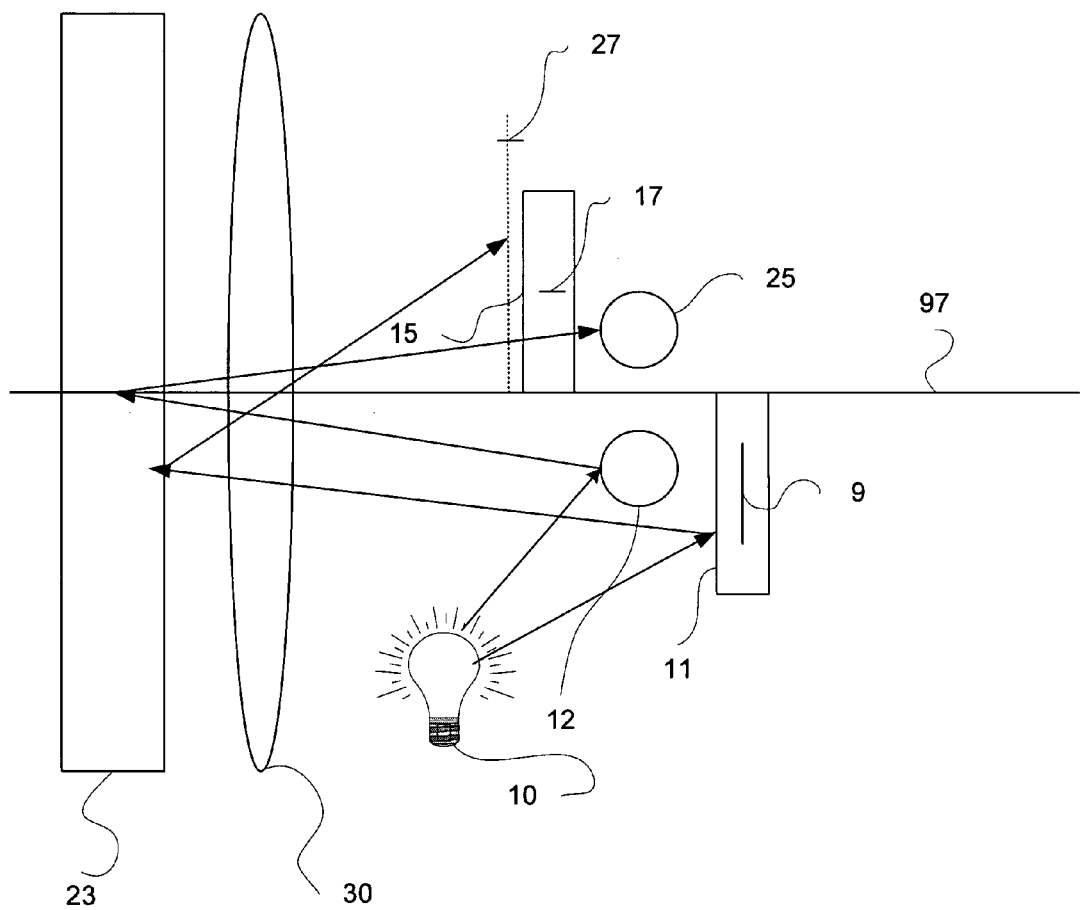
FIG. 6 is a schematic diagram of one embodiment of a flat mirror real image projection system for producing a real image of an object with a high contrast level relative to the surrounding background.

FIG. 6 is a schematic diagram of one embodiment of a flat mirror real image projection system producing a real image of an object with a high contrast level relative to the surrounding background. Light travels from source 10 illuminating object 12 and reflective polarizer 11. The principal axis of the optical system is denoted as 97. Light reflected along reflective axis travels through lens 30 to reflective surface 23. Reflective surface 23 receives light from object 12 and from polarized reflector 11. Light from object 12 passes through transmissive polarizer producing a real image of object 25. Light from reflective polarizer 11 is blocked, reflected, or absorbed because transmissive axis 17 and reflective axis 9 are orthogonal. The effect created is a dark surrounding background 1 for real image of object 25. A high contrast level is achieved for a lightly-colored real image of the object 25 compared to surrounding background 27.

Figure 7:
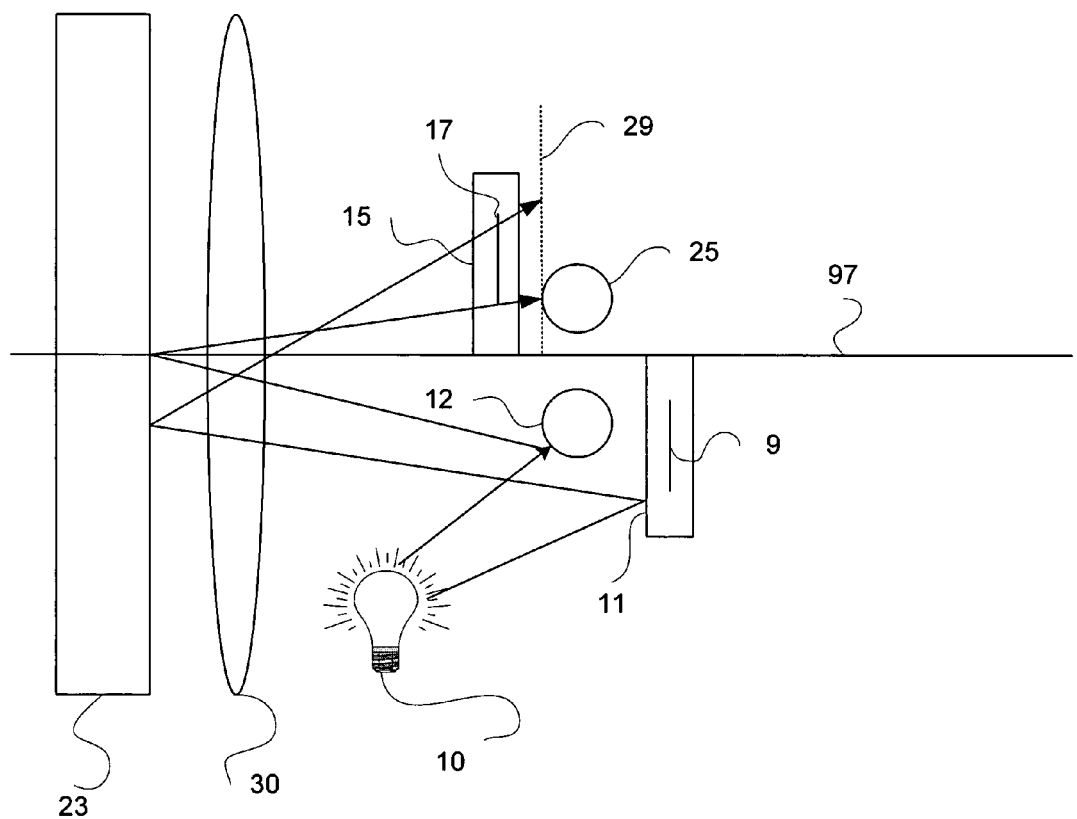
FIG. 7 is a schematic diagram of one embodiment of a flat mirror real image projection system for producing a real image of an object with a low contrast level relative to the surrounding background.

FIG. 7 is a schematic diagram of one embodiment of a flat mirror real image projection system producing a real image of an object with a low contrast level relative to the surrounding background. Light travels from source 10 illuminating object 12 and reflective polarizer 11. Light from object travels through lens 30 to reflective surface 23. Light reflected along reflective axis 9 travels through lens 30 to reflective surface 23. Reflective surface 23 transmits light from object 12 and from polarized reflector 11. Light received from object 12 passes through transmissive polarizer 15 to produce real image of the object 25. Light reflected along reflective axis 9 passes through transmissive polarizer 15 because transmissive axis 17 and reflective axis 9 are substantially parallel to each other. The effect creates a light background 29 for real image of the object 25. A low contrast level is achieved for a lightly-colored real image of the object 25 compared to surrounding background 29.

Figure 8:
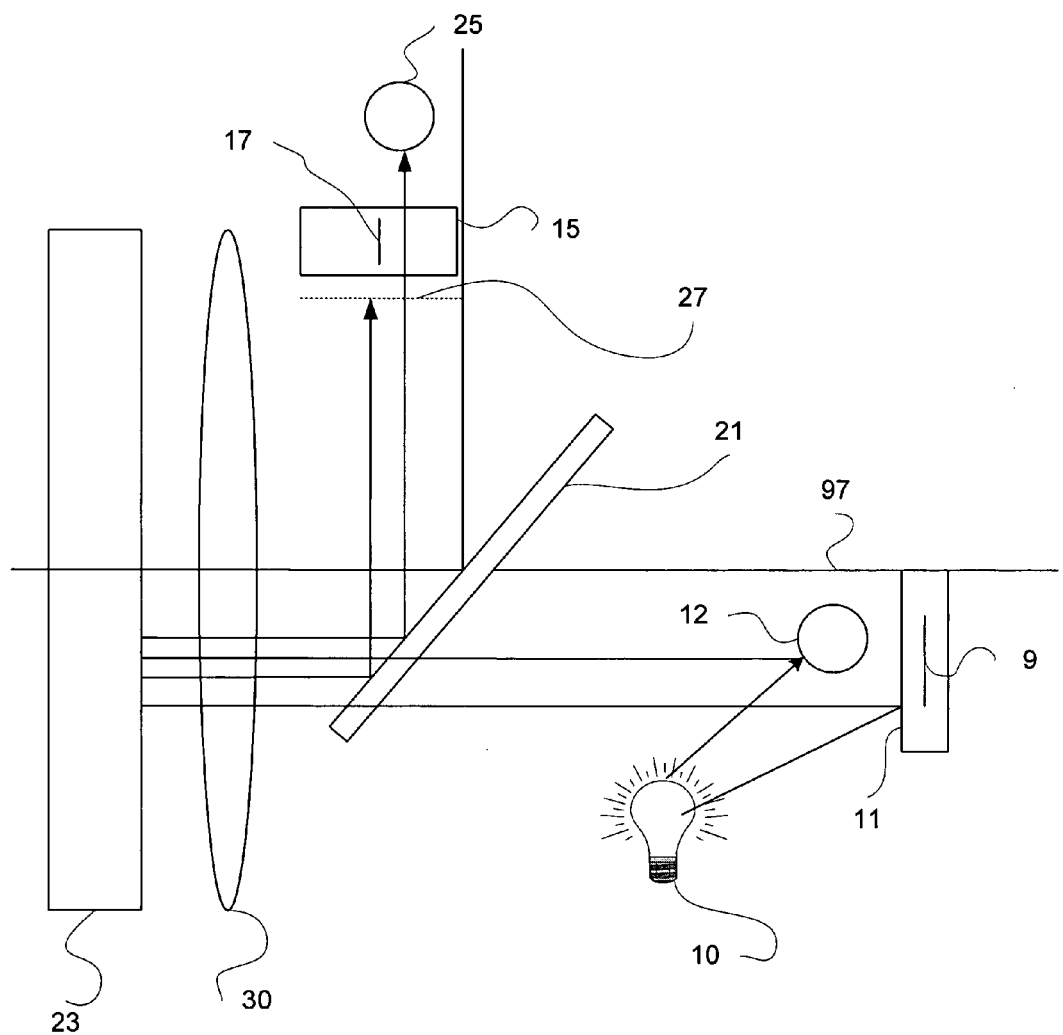
FIG. 8 is a schematic diagram of one embodiment of a flat mirror real image projection system with a beam splitter for producing a real image of an object with a high contrast level relative to the surrounding background.

FIG. 8 is a schematic diagram of one embodiment of a flat mirror real image projection system with a beam splitter producing a real image of an object with a high contrast level relative to the surrounding background. In this example, beam splitter 21 is a 50% transmissive, 50% reflective mirror. In another example, beam splitter 21 may be any ratio of transmissive to reflective coefficient mirror-like surface. Light from source 10 illuminates object 12 and polarized reflector 11. Light aligned along reflective axis 9 travels through beam splitter 21 and lens 30. Afterwards, light travels to reflective surface 23. Light reflected from object 12 travels through beam splitter and lens 30 to reflective surface 23. Light from reflective surface 23 travels back through lens 30 to beam splitter 21. Light from object is reflected by beam splitter to produce a real image of object 25 through transmissive polarizer 15. Reflected light from reflective polarizer 11 is blocked by transmissive polarizer because transmissive axis 17 and reflective axis 9 are substantially orthogonal to each other. The effect created is a dark surrounding background 27 for real image of object 25. For a lightly-colored object, a high contrast level is achieved between real image of object 25 and surrounding background 27.

In an alternative of the present aspect, optical lens 30 and reflective surface 23 may be replaced with a polarization maintaining retro-reflective material. Retro-reflective materials, for example, produced by manufacturers such as 3M Company Safety Division may be used. In yet another alternative, polarization maintaining retro-reflective materials may include spherical and corner cube techniques.

Figure 9:
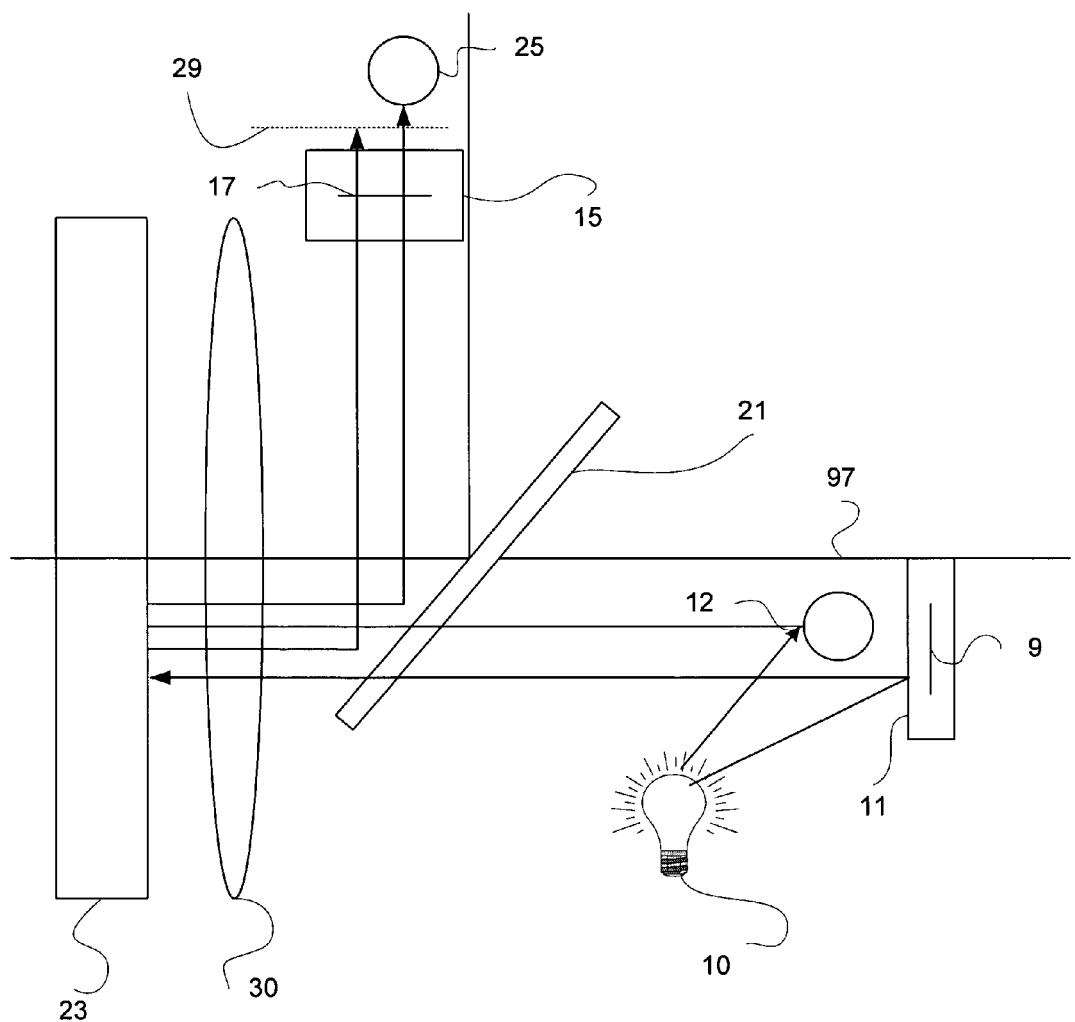
FIG. 9 is a schematic diagram of one embodiment of a flat mirror real image projection system with a beam splitter for producing a real image of an object with a low contrast level relative to the surrounding background.

FIG. 9 is a schematic diagram of one embodiment of a flat mirror real image projection system with a beam splitter producing a real image of an object with a low contrast level relative to the surrounding background. For example, beam splitter 21 is 50% transmissive and 50% reflective mirror surface. In this system, light travels from source 10 illuminating object 12 and polarized reflector 11. Light aligned with reflective axis 9 is reflected through beam splitter 21 and lens 30. Afterwards, light travels to reflective surface 23. Light reflected from object 12 passes through beam splitter 21, lens 30 to reflective surface 23. Light from reflective surface 23 passes through lens 30 to beam splitter 21. Light from object 12 is reflected by beam splitter 21 producing real image of object 25 at transmissive polarizer 15. Light from reflective polarizer 11 reflected by beam splitter passes through transmissive polarizer 15 because transmissive axis 17 and reflective axis 9 are substantially parallel to each other. The effect created is light surrounding background 29 for real image of object 25. For a lightly-colored object, a low contrast level is achieved between real image of object 25 and surrounding background 29.

In an alternative of the present aspect, optical lens 30 and reflective surface 23 may be replaced with a polarization maintaining retro-reflective material. Retro-reflective materials, for example, produced by manufacturers such as 3M Company Safety Division may be used. In yet another alternative, polarization maintaining retro-reflective materials may include spherical and corner cube techniques.

Figure 10:
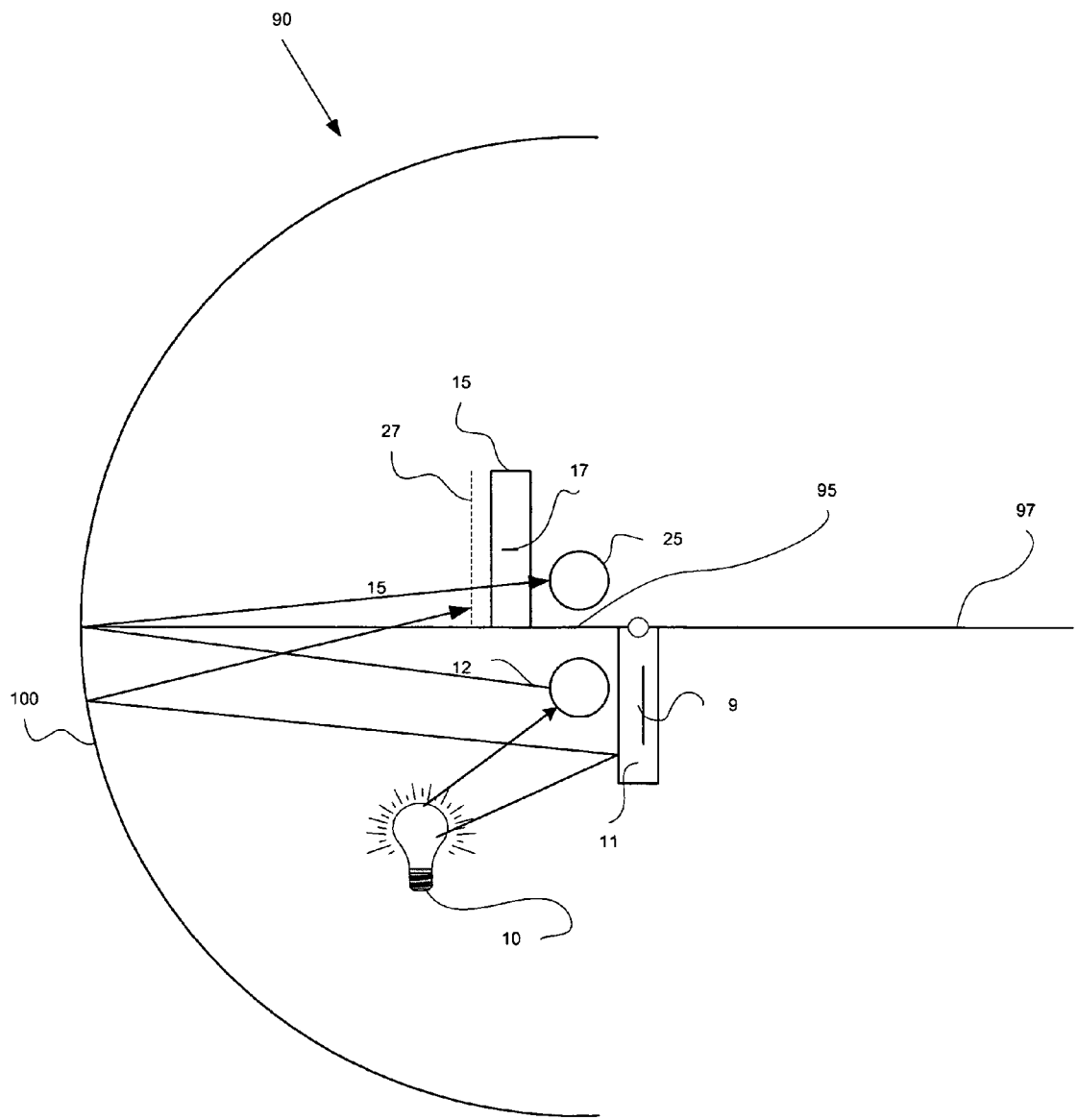
FIG. 10 is a schematic diagram of one embodiment of a parabolic mirror real image projection system producing a real image of an object with a high contrast level relative to the surrounding background.

FIG. 10 is a schematic diagram of one embodiment of a parabolic mirror real image projection system producing a real image of an object with a high contrast level relative to the surrounding background. Parabolic mirror 90 is used to generate a real image. Object 12 is placed at the focal point of parabolic mirror 90. Reflective polarizer 11 is positioned outboard of object 12 outboard of focal point 95 of parabolic mirror 90. Light travels from source 10 illuminating object 12 and reflective polarizer 11. Light reflected along reflective axis 9 travels to parabolic mirror surface 100. Light reflected from object 12 travels to parabolic mirror surface 100. Parabolic mirror surface 100 reflects light from object 12 and from polarized reflector 11. Light received from object 12 passes through transmissive polarizer 15 appearing as real image of the object 25. Light received from reflective polarizer 11 is blocked, reflected, or absorbed at transmissive polarizer 15 because transmissive axis 17 and reflective axis 9 are substantially orthogonal to each other. The effect created is a dark surrounding background 27 for real image of the object 25. A high contrast level is achieved for a real image of the object 25 and surrounding background 27.

Figure 11:
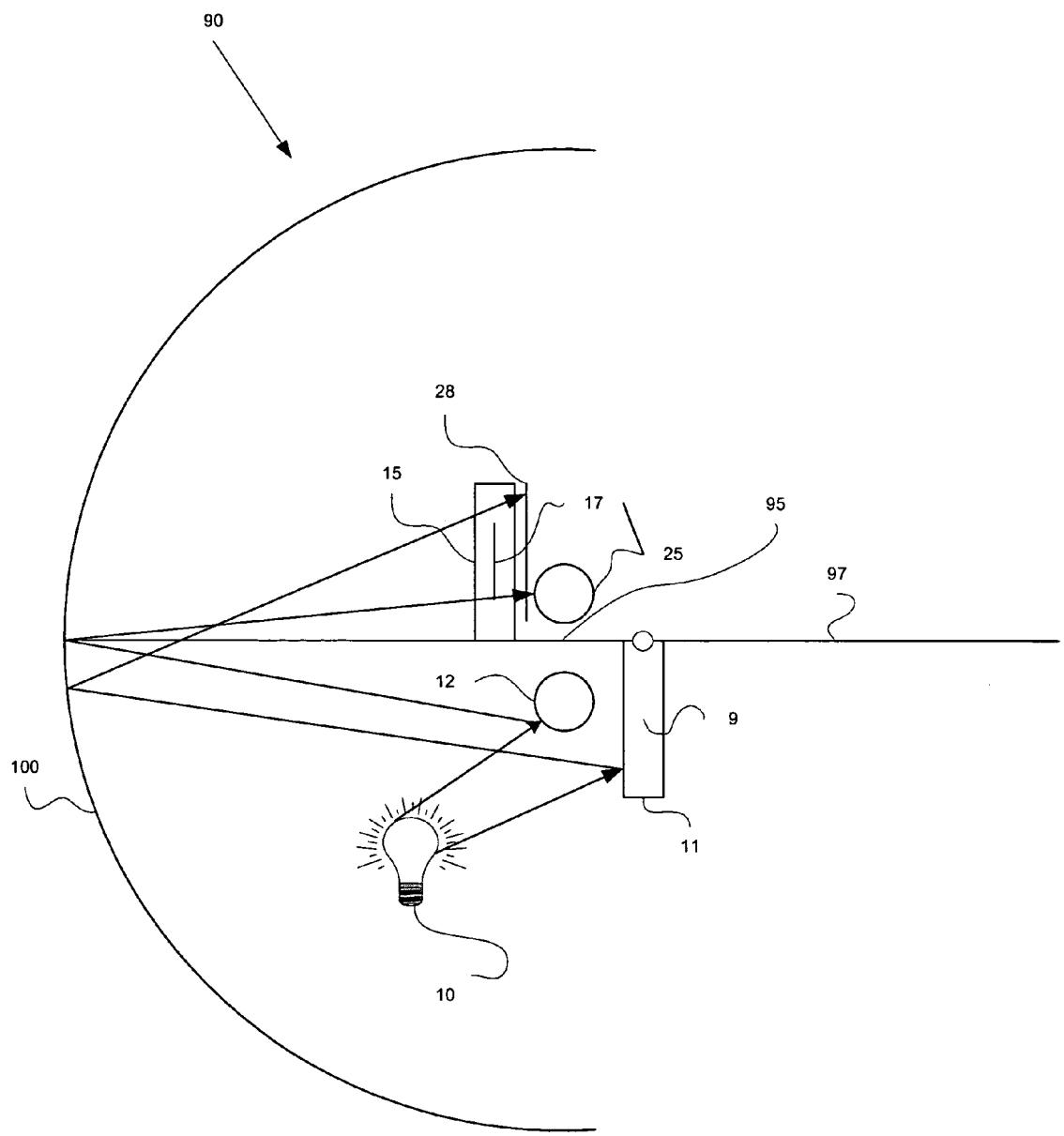
FIG. 11 is a schematic diagram of one embodiment of a parabolic mirror real image system producing a real image of an object with a low contrast level relative to the surrounding background.

FIG. 11 is a schematic diagram of one embodiment of a parabolic mirror real image projection system producing a real image of an object with a low contrast level relative to the surrounding background. Parabolic mirror 90 is used to generate a real image. Object 12 is placed at the focal point of parabolic mirror 90. Reflective polarizer 11 is positioned outboard of object 12 outboard of focal point 95 of parabolic mirror 90. Light travels from source 10 illuminating object 12 and reflective polarizer 11. Light reflected along reflective axis 9 travels to parabolic mirror surface 100. Light reflected from object 12 travels to parabolic mirror surface 100. Parabolic mirror surface 100 reflects light from object 12 and from polarized reflector 11. Light received from object 12 passes through transmissive polarizer 15 appearing as real image of the object 25 Light received from reflective polarizer 11 is blocked, reflected, or absorbed at transmissive polarizer 15 because transmissive axis 17 and reflective axis 9 are substantially parallel to each other. The effect created is a light surrounding background 27 for real image of the object 25. This effect creates a low contrast level for real image of the object 25 that is lightly colored compared to surrounding background 27.

Figure 12:
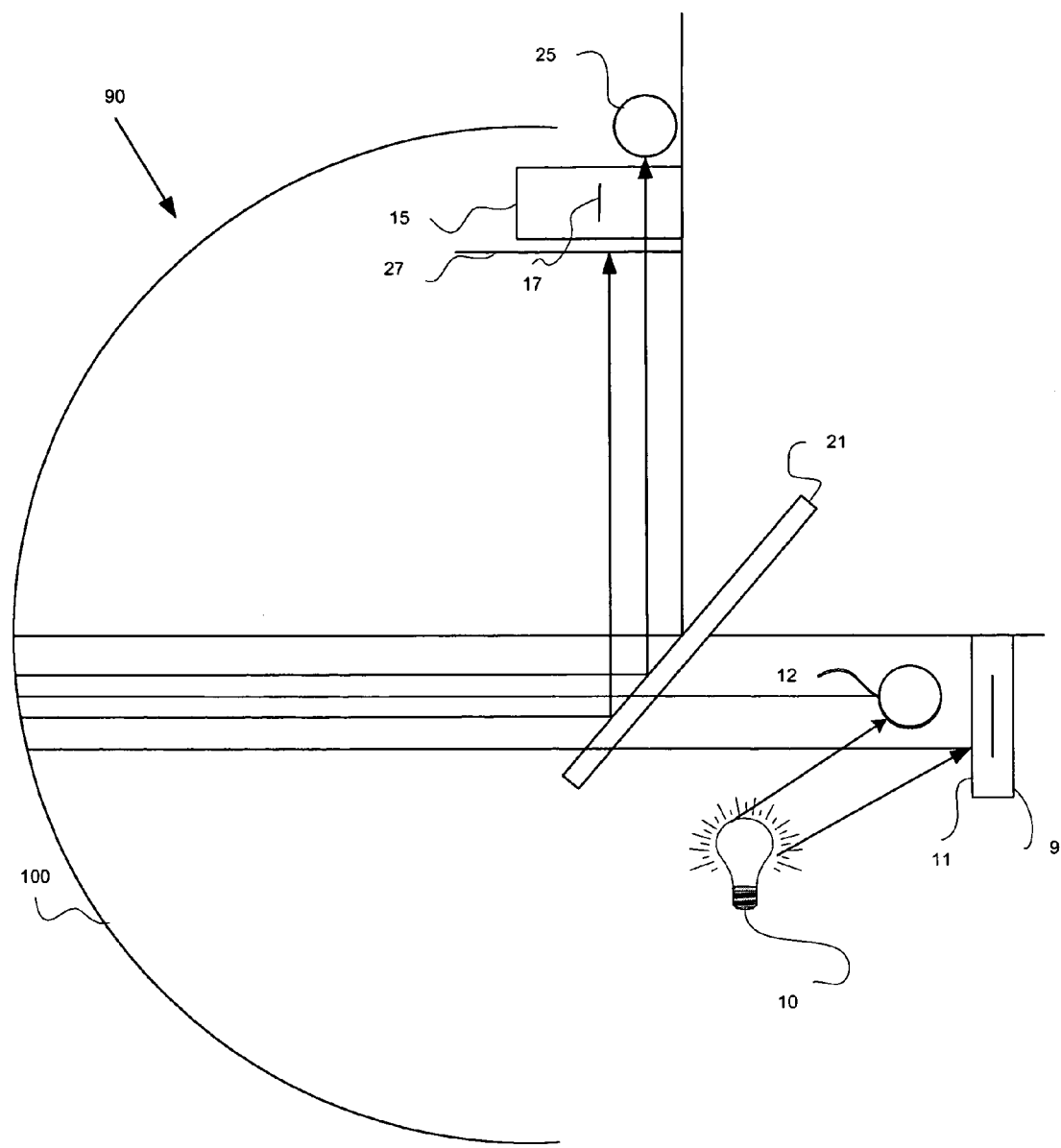
FIG. 12 is a schematic diagram of one embodiment of a parabolic mirror real image projection system with a beam splitter producing a real image of an object with a high contrast level relative to the surrounding background.

FIG. 12 is a schematic diagram of one embodiment of a parabolic mirror real image projection system with a beam splitter producing a real image of an object with a high contrast level relative to the surrounding background. Parabolic mirror 90 is used to generate a real image of the object 12. In one aspect, beam splitter 21 is a 50% transmissive and 50% reflective mirror surface. Light travels from source 10 illuminating object 12 and polarized reflector 11. Light reflected aligning with reflective axis 9 passes through beam splitter 21 to parabolic mirror surface 100. Light reflected from object 12 travels through beam splitter 21 to parabolic mirror surface 100. Parabolic mirror 90 transmits reflected light from object 12 and from polarized reflector 11 back to beam splitter 21. Light from object 12 passes through transmissive polarizer 15 to produce real image of object 25. Light from reflective polarizer 11 is blocked, reflected, or absorbed at transmissive polarizer 15 because transmissive axis 17 and reflective axis 9 are substantially orthogonal to each other. The effect created is a dark surrounding background 27 for real image of the object 25. This effect creates a high contrast level between real image of the object 25 and surround background 27.

Figure 13:
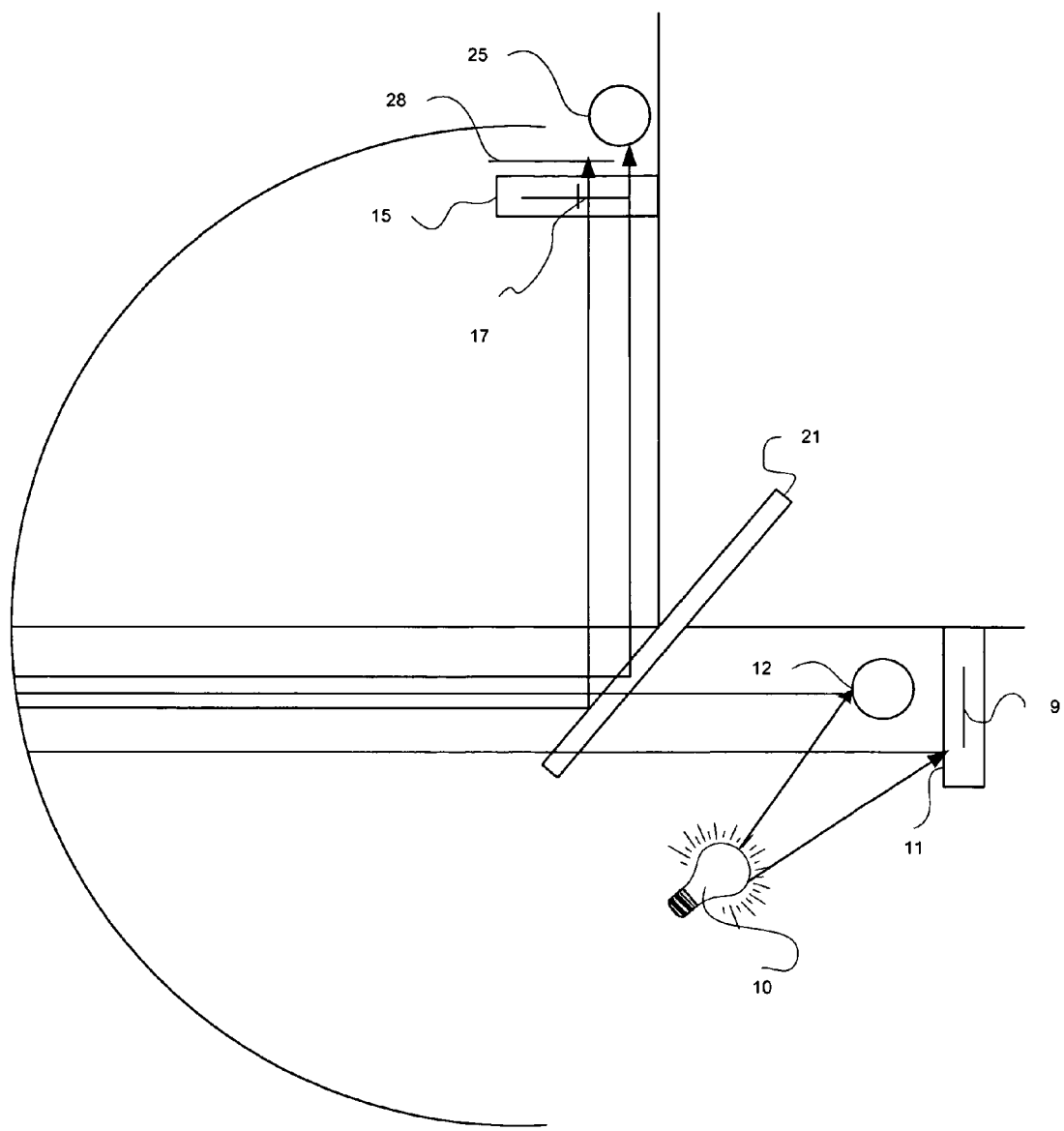
FIG. 13 is a schematic diagram of one embodiment of a parabolic mirror real image projection system with a beam splitter producing a real image of an object with a low contrast level relative to the surrounding background.

FIG. 13 is a schematic diagram of one embodiment of a parabolic mirror real image projection system with a beam splitter producing a real image of an object with a low contrast level relative to the surrounding background. Parabolic mirror 90 is used to generate a real image of the object 12. In one aspect, beam splitter 21 is a 50% transmissive and 50% reflective mirror surface. Light travels from source 10 illuminating object 12 and polarized reflector 11. Light reflected aligning with reflective axis 9 passes through beam splitter 21 to parabolic mirror surface 100. Light reflected from object 12 travels through beam splitter 21 to parabolic mirror surface 100. Parabolic mirror 90 transmits reflected light from object 12 and from polarized reflector 11 back to beam splitter 21. Light from object 12 passes through transmissive polarizer 15 to produce real image of object 25. Light from reflective polarizer 11 passes through transmissive polarizer 15 because transmissive axis 17 and reflective axis 9 are substantially parallel to each other. The effect is creating a light surrounding background 29 for real image of object 25.

Figure 14:
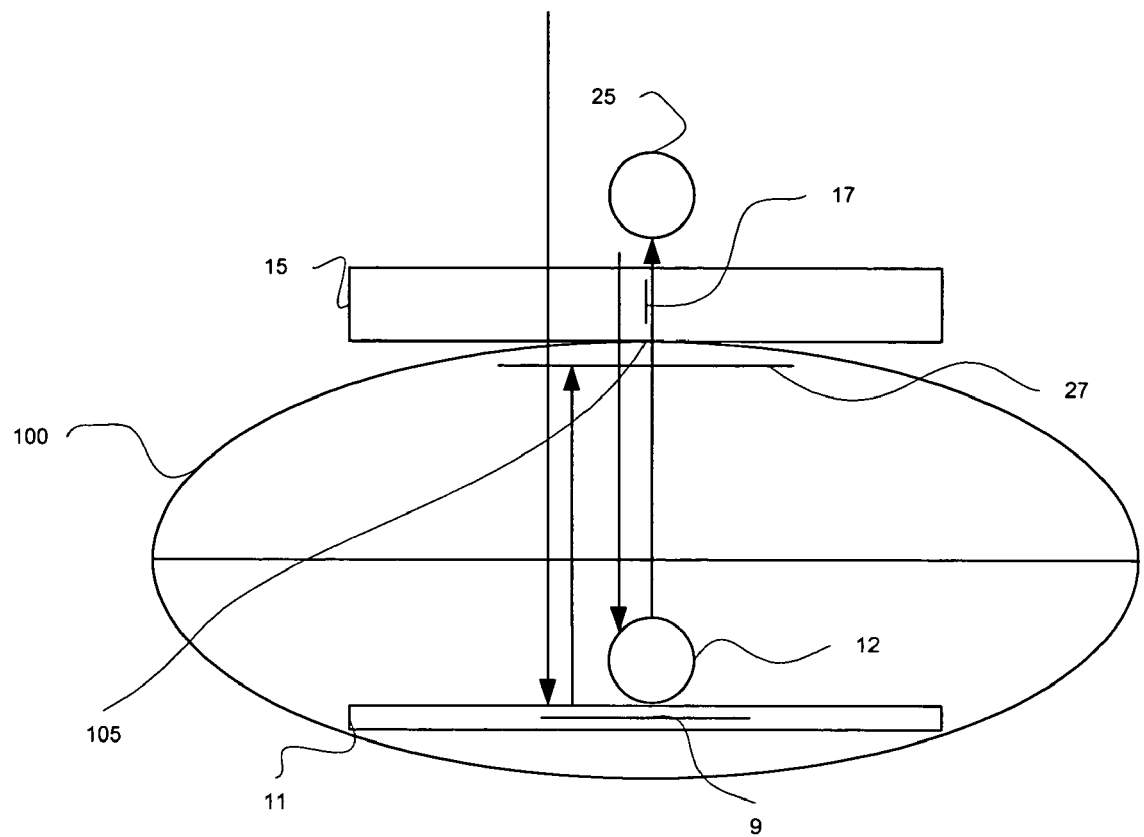
FIG. 14 is a schematic diagram of one embodiment of a double clam shell real image projection system producing a real image of an object with a high contrast level relative to the surrounding background.

FIG. 14 is a schematic diagram of one embodiment of a double clam shell real image projection system producing a real image of an object with a high contrast level relative to the surrounding background. In this aspect, two parabolic mirror surfaces are attached together. Two parabolic mirror surfaces are placed facing each other. Opening 105 is created in one mirror. Object 12 is placed in the center of a parabolic mirror surface. Reflective polarizer 11 is placed under object 12 on mirror surface. Transmissive polarizer is placed over opening 105. Light travels from light source 10 through transmissive polarizer 15 illuminating object 12 and reflective polarizer 11. Light from object 12 passes through transmissive polarizer 15 producing real image of the object 25. Light reflected along reflective axis 9 travels back to transmissive polarizer 15. Light from reflective polarizer 11 is blocked by transmissive polarizer 15 because transmissive axis 17 and reflective axis 9 are substantially orthogonal to each other. The effect created is a dark surrounding background 27 for real image of object 25.

Figure 15:
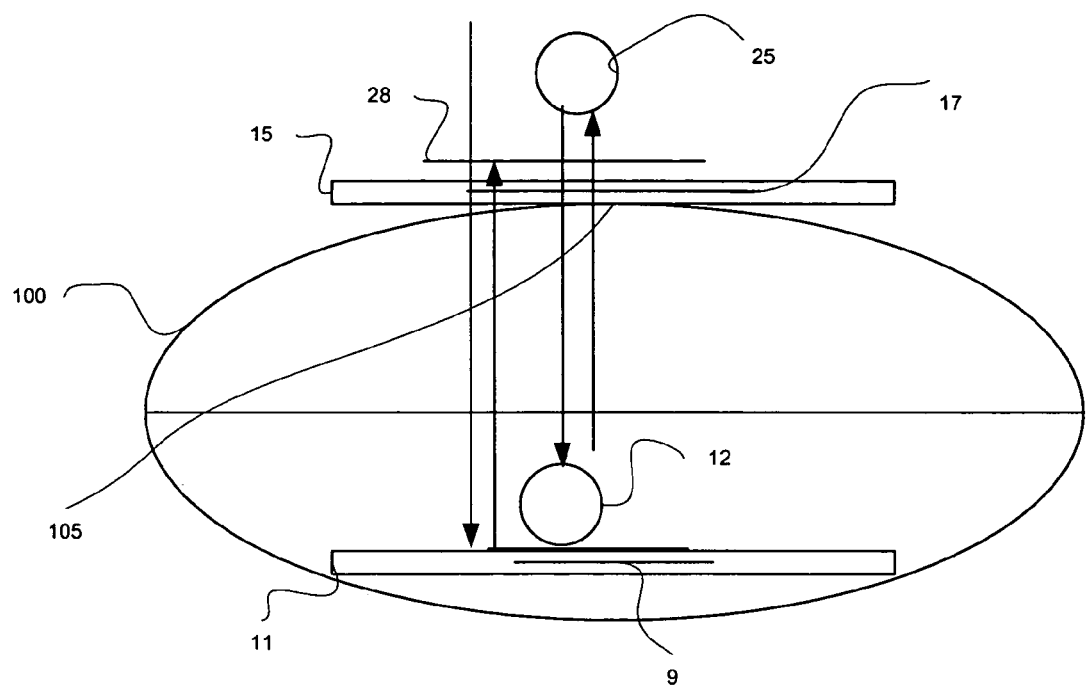
FIG. 15 is a schematic diagram of one embodiment of a double clam shell real image projection system producing a real image of an object with a low contrast level relative to the surrounding background.

FIG. 15 is a schematic diagram of one embodiment of a double clam shell real image projection system producing a real image of an object with a low contrast level relative to the surrounding background. In this aspect, two parabolic mirror surfaces are attached together. Two parabolic mirror surfaces are placed facing each other. Opening 105 is created in one mirror. Object 12 is placed in the center of a parabolic mirror surface. Reflective polarizer 11 is placed under object 12 on mirror surface. Transmissive polarizer is placed over opening 105. Light travels from light source 10 through transmissive polarizer 15 illuminating object 12 and reflective polarizer 11. Light from object 12 passes through transmissive polarizer 15 producing real image of the object 25. Light reflected along reflective axis 9 travels back to transmissive polarizer 15. Light from reflective polarizer 11 passes through transmissive polarizer 15 because transmissive axis 17 and reflective axis 9 are substantially parallel to each other. The effect created is a dark surrounding background 27 for real image of object 25. The effect creates a high contrast level between a lightly colored real image of object 25 and surrounding background 27.

Figure 16:
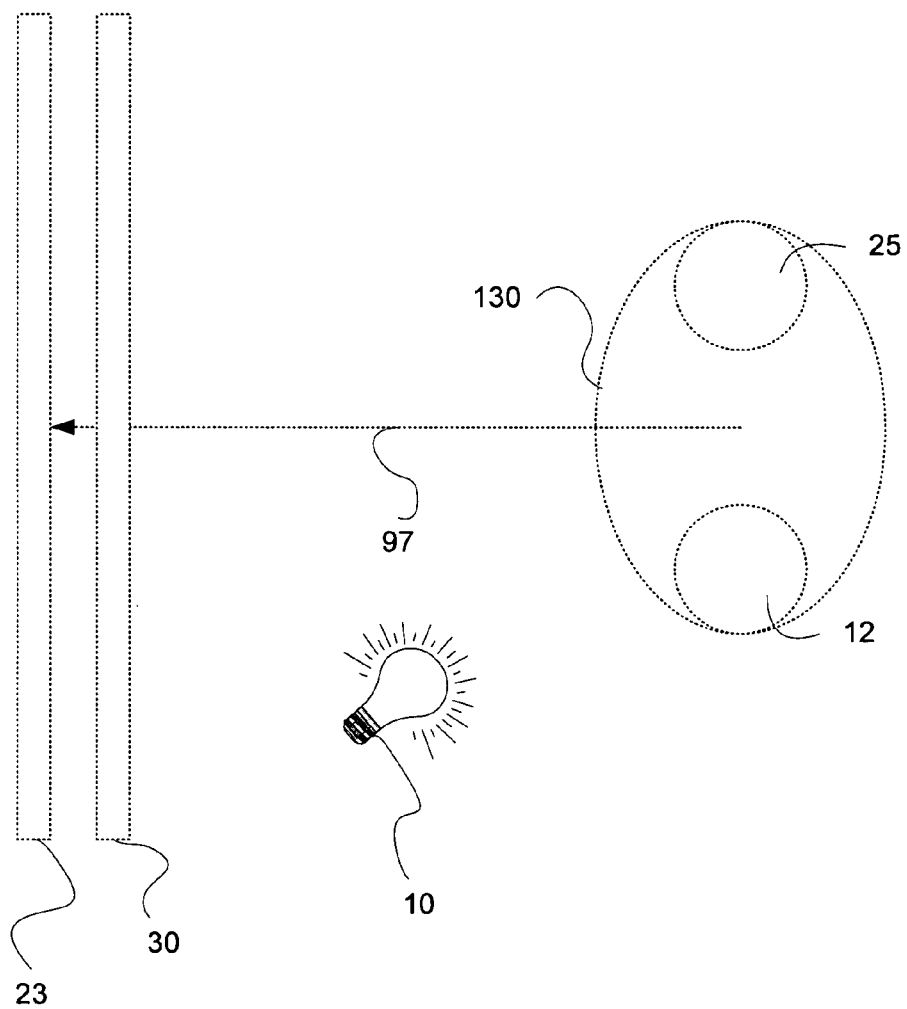
FIG. 16 is a schematic of a prior art real projection system utilizing a minimized sweet spot between an object and a geometrically separated real image of the object.

FIG. 16 is a schematic of a prior art real projection system utilizing a minimized sweet spot between an object and a geometrically separated real image of the object. Sweet spot 130 of the optical system is the distortion free volume useful for the generation of a real image. Sweet spot 130 is the volume occupied by object 12, real image of the object 25 and the space between object 12 and real image of the object 25. Since object 12 and real image 25 are geographically adjacent, ½ of sweet spot 130 is reserved for object 12 and ½ of the sweet spot 130 is reserved for real image of the object 25. In this system, there is only one sweet spot.

Figure 17:
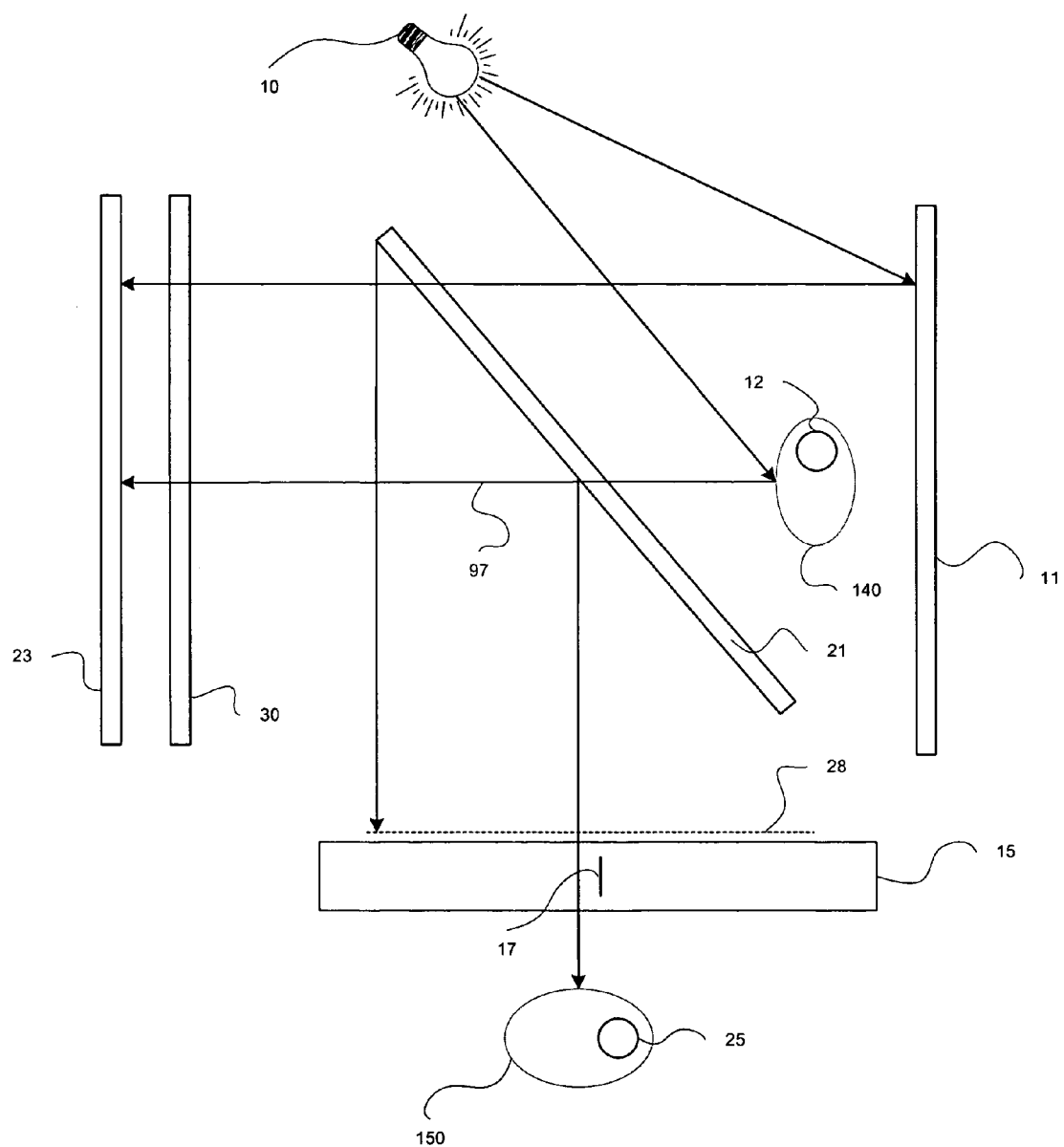
FIG. 17 is a schematic of a real projection system utilizing a maximized sweet spot producing a real image of an object with a high contrast level and where the object and the real image of the object are geographically separated.

FIG. 17 is a schematic of a maximized sweet spot real projection system producing a real image of an object with a high contrast level and where the object and the real image of the object are geographically separated. In this aspect, a beam splitter is used to generate a real image projection system with two non-geographically adjacent sweet spots. Each of these sweet spots 140, 150 is the same size as the sweet spot from the FIG. 16 sweet spot. The object sweet spot 140 is the same size as the real image sweet spot 150. In this example, object 12 is located at sweet spot 140. In one aspect, sweet spot 140 is focal point of reflective surface 23.

Light from source 10 illuminates object 12 and reflective polarizer 11. Light from object 12 passes through beam splitter 21 and lens 30. Light aligned with reflective axis 9 passes through beam splitter 21 and lens 30. In this aspect, reflective surface 23 is a concave mirror. Light from object 12 reflected by beam splitter 21 to transmissive polarizer 15 produces real image of object 25 in real image sweet spot 150. Light from reflective surface 23 and from reflective axis 9 is blocked because transmissive polarizer 15 and reflective polarizer 11 are substantially orthogonal to each other. The effect is to produce a dark background 27 for real image of object 25. The effect creates for a lightly colored real image of the object 25 a high contrast level compared to its surrounding background 27.

In yet another instance, sweet spot 150 is used for projecting real image of the object 25 and sweet spot 140 is used for object 12. In yet another aspect, reflective surface 23 and lens 30 are replaced by a laminate composite of a Fresnel lens and a mirror.

Figure 18:
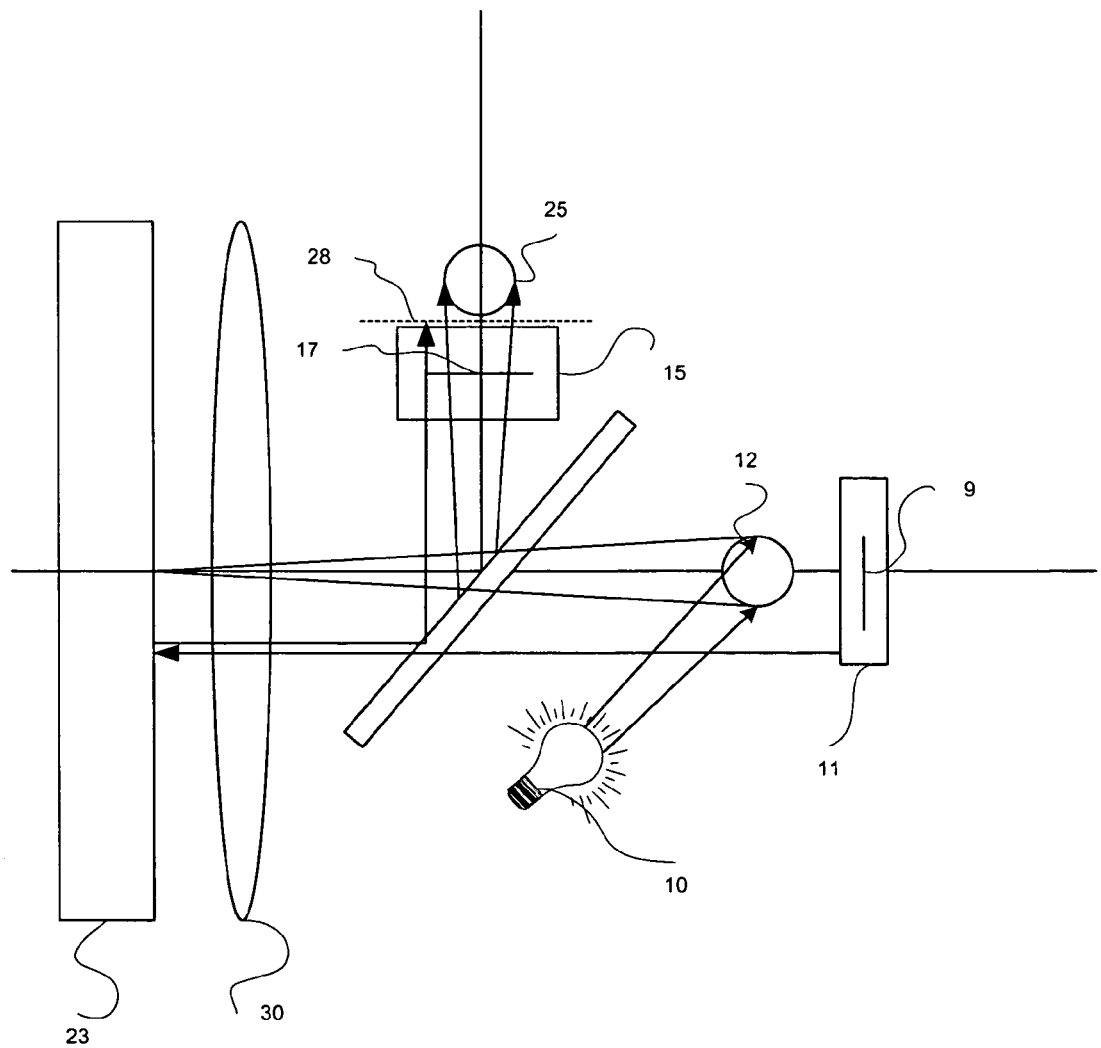
FIG. 18 is a schematic of a maximized sweet spot real projection system producing a real image of an object with a low contrast level and where the object and the real image of the object are geographically separated.

FIG. 18 is a schematic of a maximized sweet spot real image projection system producing a real image of an object with a low contrast level and where the object and the real image of the object are geographically separated. In this aspect, a beam splitter is used to generate a real image projection system with two non-geographically adjacent sweet spots. Each of these sweet spots 140, 150 is the same size as the sweet spot from the FIG. 16 sweet spot. The object sweet spot 140 is the same size as the real image sweet spot 150. In this example, object 12 is located at sweet spot 140. In one aspect, sweet spot 140 is focal point of reflective surface 23.

Light from source 10 illuminates object 12 and reflective polarizer 11. Light from object 12 passes through beam splitter 21 and lens 30. Light aligned with reflective axis 9 passes through beam splitter 21 and lens 30. In this aspect, reflective surface 23 is a concave mirror. Light from object 12 reflected by beam splitter 21 to transmissive polarizer 15 produces real image of object 25 in real image sweet spot 150. Light from reflective surface 23 from reflective axis 9 is blocked because transmissive polarizer 15 and reflective polarizer 11 are substantially parallel to each other. The effect is to produce a light background 29 for real image of the object 25. The effect creates for a lightly colored real image of the object 25 a low contrast level compared to its surrounding background 29.

In yet another instance, sweet spot 150 is used for projecting real image of the object 25 and sweet spot 140 is used for object 12. In yet another aspect, reflective surface 23 and lens 30 are replaced by a laminate composite of a Fresnel lens and a mirror.

Figure 19:
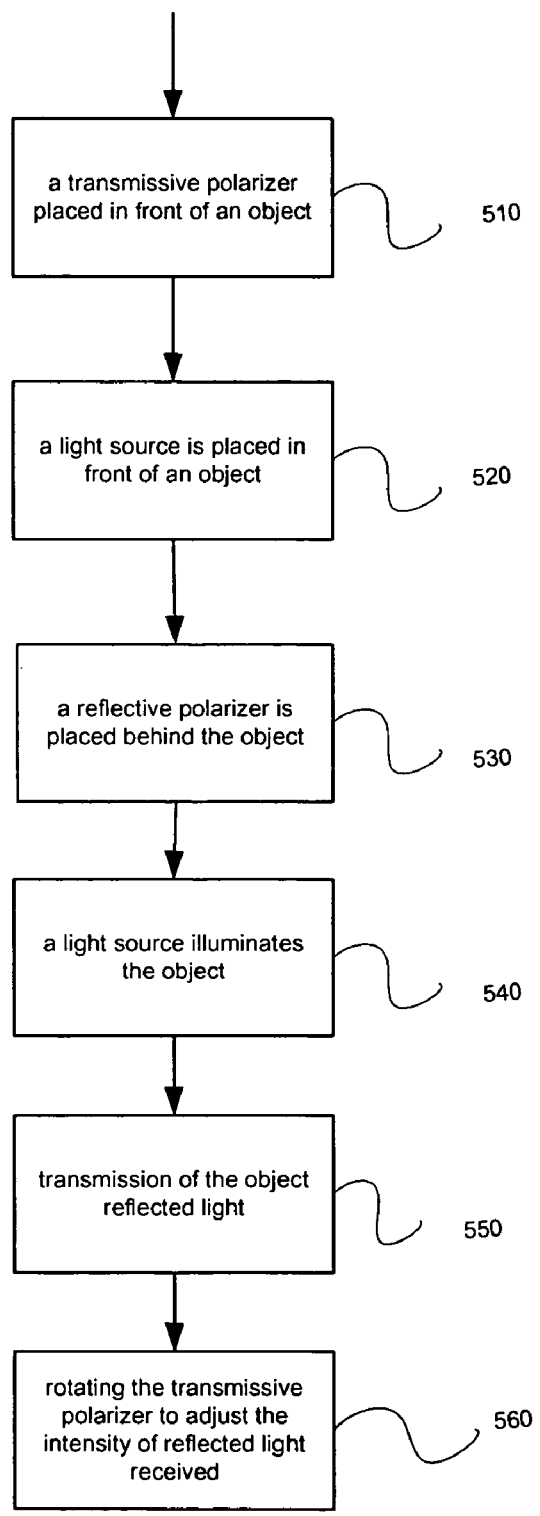
FIG. 19 is a flow chart for one embodiment for controlling the contrast level of an object relative to the surrounding background.

FIG. 19 is a flow chart for one embodiment for controlling the contrast level of an object relative to the surrounding background. A transmissive polarizer is placed in front of an object as indicated in block 510. A light source is placed in front of the object and behind the transmissive polarizer as indicated in block 520. A reflective polarizer is placed behind the object as indicated in block 530. A light source illuminates the object as indicated in block 540. The same intensity of reflected light from the object transmitted by the transmissive polarizer independent of a rotation of the transmissive axis to the reflective axis as indicated in block 550.

The transmissive polarizer may be rotated to adjust the intensity of reflected light received from the reflective polarizer at the transmissive polarizer as indicated in block 560. In one alternative, the transmissive axis is rotated to a ninety degree orientation relative to the reflective axis to achieving a maximum contrast level between the object and the surrounding background. In another alternative, the transmissive axis is rotated from substantially zero degrees to ninety degrees orientation relative to the reflective axis for changing the surrounding background from light to dark.

In yet another alternative, the reflective axis is rotated to a substantially ninety degree orientation relative to the transmissive axis for achieving a maximum contrast level between an object and the surrounding background. In yet another alternative, the transmissive axis is aligned substantially parallel to the reflective axis for achieving a minimum contrast level between the object and the surrounding background.

Information as herein shown and described in detail is fully capable of attaining the above-described object of the disclosure and the present embodiment of the disclosure, and is, thus, representative of the subject matter, which is broadly contemplated by the present disclosure. The scope of the present disclosure fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, one skilled in the art should recognize that various changes and modifications in form and material details may be made without departing from the spirit and scope of the inventiveness as set forth in the appended claims. No claim herein is to be construed under the provisions of 35 U.S.C. § 112, sixth paragraph, unless the element is expressly recited using the phrase "means for."

What is claimed is:

1. A method of adjusting contrast in an optical system between an object and surrounding background, comprising:

providing a non-polarizing light source in front of an object and illuminating the object with non-polarized light, the illuminated object reflecting non-polarized light;

providing a reflective polarizer having a reflective axis behind the object, the reflective polarizer being configured to receive non-polarized light from the non-polarizing light source and reflect polarized light;

providing a transmissive polarizer having a transmissive axis in front of the object, the transmissive polarizer being configured to receive the non-polarized light reflected from the object and the polarized light reflected from the reflective polarizer; and adjusting the contrast between the object and the surrounding background by adjusting the transmissive axis of the transmissive polarizer relative to the reflective axis of the reflective polarizer.

2. The method of claim 1 wherein positioning the transmissive axis substantially orthogonal to the reflective axis maximizes the contrast level between the object and the surrounding background.

3. The method of claim 1 wherein positioning the transmissive axis substantially parallel to the reflective axis minimizes the contrast level between the object and the surrounding background.

4. The method of claim 1 wherein rotating the orientation of the transmissive axis relative to the reflective axis from substantially zero degrees to substantially ninety degrees adjusts the contrast level between the object and the surrounding background from light to dark.

5. The method of claim 1 wherein the positioning the transmissive axis substantially orthogonal to the reflective axis achieves a dark surrounding background.

6. The method of claim 1 wherein positioning the transmissive axis substantially parallel to the reflective axis creates a light contrast level.

7. The method of claim 1 wherein the brightness of the object is of a substantially fixed intensity and independent of the orientation of the transmissive axis and reflective axis.

8. The method of claim 1 wherein the brightness of the object is dependent on the intensity of the light source.

9. The method of claim 1 wherein the reflective polarizer comprises a transmissive polarizer and a polarization maintaining mirror.

10. A system for adjusting contrast in an optical system, comprising:
a non-polarizing light source for illuminating an object;
a reflective polarizer, the reflective polarizer having a reflective axis and being configured to receive non-polarized light from the non-polarizing light source and reflect polarized light; and
a transmissive polarizer, the transmissive polarizer having a transmissive axis and being configured to receive non-polarized light reflected from the object and polarized light reflected from the reflective polarizer.

11. The system of claim 10 wherein positioning a transmissive axis of the transmissive polarizer substantially orthogonal to the reflective axis maximizes the contrast level between the object and the surrounding background.

12. The system of claim 10 wherein positioning the transmissive axis substantially parallel to the reflective axis minimizes the contrast level between the object and the surrounding background.

13. The system of claim 10 wherein rotating the orientation of the transmissive axis relative to the reflective axis from substantially zero degrees to substantially ninety degrees adjusts the contrast level between the object and the surrounding background from light to dark.

14. The system of claim 10 wherein the positioning the transmissive axis substantially orthogonal to the reflective axis achieves a dark surrounding background.

15. The system of claim 10 wherein positioning the transmissive axis substantially parallel to the reflective axis creates a light contrast level.

16. The system of claim 10 wherein the brightness of the object is of a substantially fixed intensity and independent of the orientation of the transmissive axis and reflective axis.

17. The system of claim 10 wherein the brightness of the object is dependent on the intensity of the light source.

18. The system of claim 10 wherein positioning the first transmissive axis substantially parallel to the second transmissive axis creates a light contrast level.

19. The system of claim 10 wherein the brightness of the object is of a substantially fixed intensity and independent of the orientation of the first and second transmissive axes.

20. The system of claim 10 wherein the reflective polarizer comprises a transmissive polarizer and a polarization maintaining mirror.

21. A method of adjusting the contrast in an optical system, the method comprising:
illuminating an object with a non-polarizing light source;
providing a reflective polarizer behind the illuminated object;
providing a transmissive polarizer in front of the illuminated object; and
adjusting the orientation of a reflective axis of the reflective polarizer relative to a transmissive axis of the transmissive polarizer, thereby adjusting the contrast between the object and surrounding background.

22. The method of claim 21 wherein positioning the transmissive axis substantially orthogonal to the reflective axis maximizes the contrast level between the object and the surrounding background.

23. The method of claim 21 wherein the positioning the transmissive axis substantially orthogonal to the reflective axis achieves a dark surrounding background.

24. The method of claim 21 wherein rotating the orientation of the transmissive axis relative to the reflective axis from substantially zero degrees to substantially ninety degrees adjusts the contrast level between the object and the surrounding background from light to dark.

25. The method of claim 21 wherein positioning the transmissive axis substantially parallel to the reflective axis minimizes the contrast level between the object and the surrounding background.

26. The method of claim 21 wherein positioning the transmissive axis substantially parallel to the reflective axis creates a light contrast level.

27. The method of claim 21 wherein the brightness of the object is of a substantially fixed intensity and independent of the orientation of the transmissive axis and reflective axis.

28. The method of claim 21 wherein the brightness of the object is dependent on the intensity of the light source.

29. The method of claim 21 wherein the reflective polarizer comprises a transmissive polarizer and a polarization maintaining mirror.

30. A method of adjusting contrast in an optical system comprising:
illuminating an object with a non-polarizing light source;
providing a first polarizer behind the object, the first polarizer having a first transmissive axis;
providing a mirror behind the first polarizer;
providing a second polarizer in front of the object, the second polarizer having a second transmissive axis and being configured to receive non-polarized light reflected from the object and polarized light reflected from the mirror; and
adjusting the contrast between the object and the surrounding background by adjusting the relative orientation of the first and second transmissive axes.

31. The method of claim 30 wherein the mirror maintains the polarization of the light.

32. The method of claim 30 wherein positioning the first transmissive axis substantially orthogonal to the second transmissive axis maximizes the contrast level between the object and the surrounding background.

33. The method of claim 30 wherein positioning the first transmissive axis substantially parallel to the second transmissive axis minimizes the contrast level between the object and the surrounding background.

34. The method of claim 30 wherein rotating the orientation of the first transmissive axis relative to the second transmissive axis from substantially zero degrees to substantially ninety degrees adjusts the contrast level between the object and the surrounding background from light to dark.

35. The method of claim 30 wherein the positioning the first transmissive axis substantially orthogonal to the second transmissive axis achieves a dark surrounding background.

36. The method of claim 30 wherein the brightness of the object is dependent on the intensity of the light source.

* * * * *